United States Patent [19]

Marron et al.

[11] Patent Number: 4,827,435

[45] Date of Patent: May 2, 1989

[54] BLADE PITCH MEASUREMENT APPARATUS AND METHOD

[75] Inventors: Gerald I. Marron, Springfield; Wilbert B. Rethage, Washington Township, Westmoreland County, both of Pa.

[73] Assignee: Westinghouse Electric Corp., Pittsburgh, Pa.

[21] Appl. No.: 930,215

[22] Filed: Nov. 12, 1986

[51] Int. Cl.$^4$ ..................... G01H 11/00; G06G 15/46
[52] U.S. Cl. ..................................... 364/559; 73/660; 356/375
[58] Field of Search ................... 29/156.8 B; 356/375, 356/376, 384, 23; 250/561, 563; 73/655, 660, 455; 377/17; 364/559

[56] References Cited

U.S. PATENT DOCUMENTS 4,384,819  5/1983  Baker .............................. 324/58.5 B
4,413,519  11/1983 Bannister et al. ..................... 73/655
4,518,917  5/1985  Oates et al. ........................... 73/660
4,593,566  6/1986  Ellis ..................................... 73/660

FOREIGN PATENT DOCUMENTS 0590634  1/1978  U.S.S.R. ............................. 73/117.3

Primary Examiner—Parshotam S. Lall
Assistant Examiner—Ellis B. Ramirez

[57] ABSTRACT

A blade pitch measurement apparatus comprises first means for providing an indication of the instantaneous angular position of the rotor relative to a reference location and second means for providing an indication of the passage of a tenon through a selected location about the rotor. A third means is operatively coupled to and responsive to the indications provided by the first and second means for providing an indication of the angular position of each tenon and for computing blade pitch. A method of measuring blade pitch is also disclosed.

22 Claims, 5 Drawing Sheets

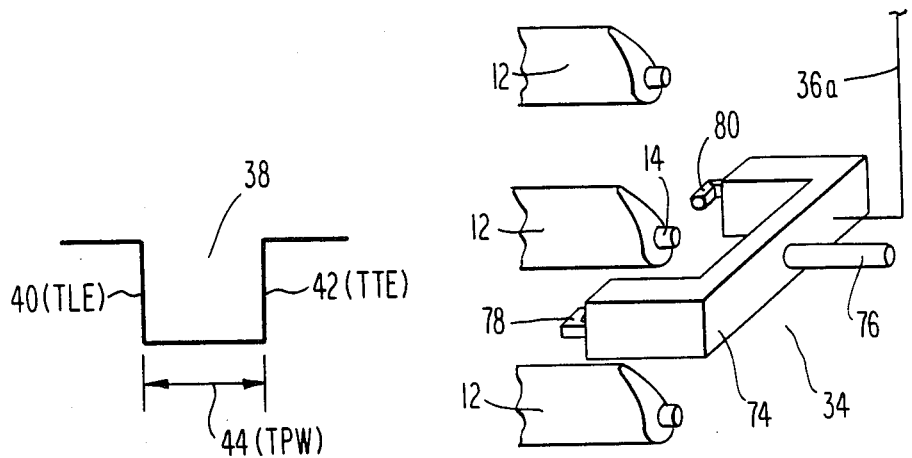
Fig. 5
Fig. 6
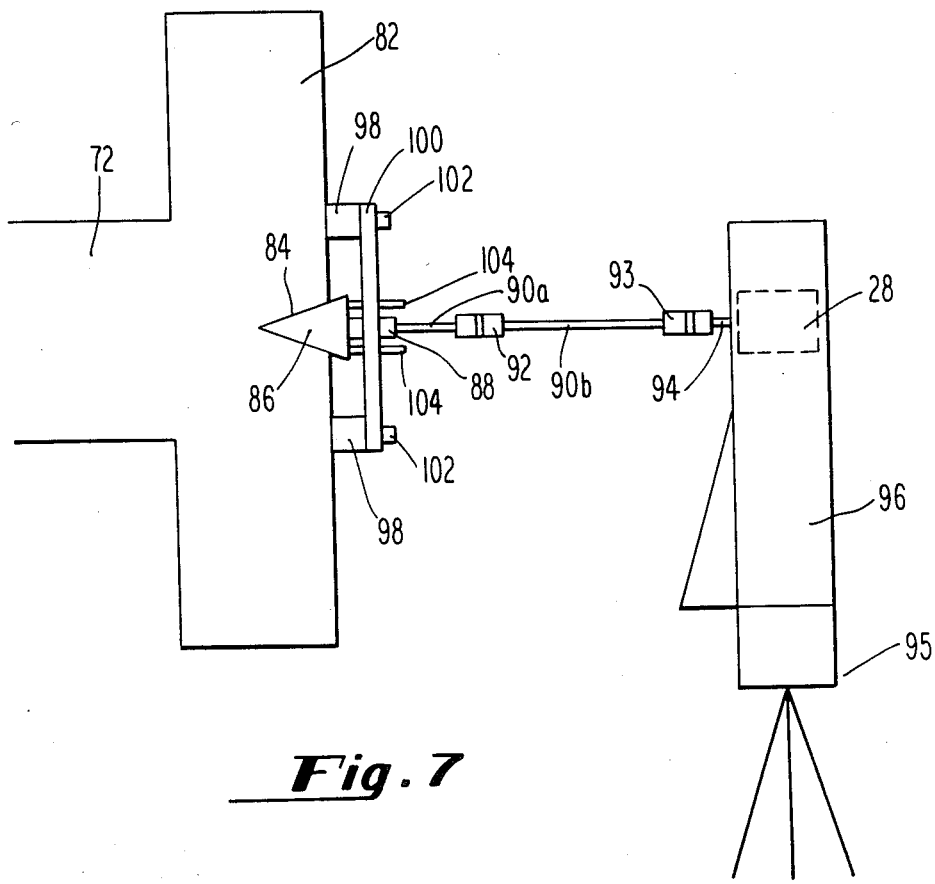
Fig. 7

BLADE PITCH MEASUREMENT APPARATUS AND METHOD

BACKGROUND OF THE INVENTION

1. Field of the Invention

The present invention relates generally to an apparatus and method for measuring the circumferential spacing (pitch) between adjacent ones of a plurality of objects spaced about and rotatable with a rotor. The present invention has particular application to measurement of blade pitch in a turbine of the type having a plurality of blades disposed in at least one row about and rotatable with a rotor, and having a tenon disposed on the distal end of each blade for attachment to a shroud.

2. Description of the Prior Art

Presently, it is known to measure blade pitch manually with a modified vernier caliper. A blader uses the caliper to measure the chordal distance between the edges of adjacent tenons at points at the top of each tenon. The resulting measurement is known as measured pitch. The blader then applies a correction factor to the measured pitch to obtain the circumferential distance between the centers of adjacent tenons to obtain true pitch. The correction factor is manually computed from the mean tenon height (obtained from the blade drawing), mean shroud thickness (obtained from the shroud drawing) and a pitch measurement correction factor chart provided to the blader. The true pitch data is then manually entered onto another chart that is utilized for fabrication of the turbine shroud.

The above described method of measuring blade pitch does not provide accurate and consistent data. Problems arise from measurement inaccuracies and human error. Moreover, this method is time consuming, tedious and inefficient.

It is therefore desirable to provide an apparatus and method for the automated measurement of blade pitch that does not require the use of a caliper. It is also desirable to provide an apparatus for and method of measuring blade pitch that minimizes human intervention, and that is accurate, consistent and efficient to operate.

SUMMARY OF THE INVENTION

An apparatus is provided for measuring blade pitch in a turbine having a rotor, at least one row of blades circumferentially disposed about and rotatable with the rotor, and a tenon disposed at the distal end of each blade for attachment to a shroud. The apparatus comprises first means for providing an indication of the instantaneous angular position of the rotor relative to a reference location, second means for providing an indication of the passage of each tenon through a selected location about the rotor, and third means operatively coupled to and responsive to the indications provided by the first and second means for providing an indication of the angular position of each tenon. According to the invention, the first means comprises an angle encoder operatively coupled to the rotor for rotation therewith. The angle encoder provides a first pulse train in response to rotation of the rotor wherein the number of pulses in the first pulse train, counted from the beginning of a measurement cycle, is indicative of the instantaneous angular position of the rotor relative to the reference location. The second means comprises a tenon sensor disposed at the selected angular location about the rotor. The tenon sensor provides a second pulse train in response to passage of tenons through the selected location wherein the number of pulses in the second pulse train, counted from the beginning of a measurement cycle, is indicative of the number of tenons that have passed through the selected location. According to the preferred embodiment of the invention, the tenon sensor comprises a light source adapted to direct a light beam across the path of rotation of the tenons and a photodetector positioned to detect when a tenon is in the path of the light beam. Each time a tenon passes through the selected location, the photodetector provides a pulse having a leading edge indicative of a tenon entering the selected location and a trailing edge indicative of the tenon exiting the selected location. The pulse width is indicative of tenon diameter.

The third means comprises a micro-computer operatively coupled to the tenon sensor and angle encoder to receive the pulses in the first and second pulse trains. The micro-computer is programmed to count the number of pulses in each of the first and second pulse trains and to compute, for each tenon detected by the tenon sensor, a blade data record comprising (i) the number of the blade containing the tenon, (ii) the angular position of the rotor and relative time when the tenon first entered the selected location, and (iii) the angular position of the rotor and relative time when the tenon exited the selected location. The micro-computer may include a display for providing a visual indication of each blade data record.

A host computer operatively coupled to the micro-computer receives the blade data records from the micro-computer. The host computer includes user input means, such as a keyboard, for entering data indicative of (i) the mean distance between the tenon distal ends and the rotor axis, (ii) mean tenon height, (iii) mean shroud thickness, and (iv) the number of blades in the row. The host computer is programmed to operate upon the user input data to compute the mean distance between the rotor axis and a shroud centerline and to determine the true pitch of each tenon along the shroud centerline. A printer provides a printout of pitch versus blade number.

Also disclosed is a means for operatively coupling the shaft of the angle encoder to the rotor. The disclosed means comprises a fitting adapted to mate with a centerhole in a hub end of the rotor and a rod having one end fixedly secured to the fitting. The other end of the rod is fixedly secured to the shaft of the angle encoder via a flexible coupling. Additional means are provided for urging the fitting into frictional engagement with the wall of the centerhole and include a pair of magnet bases for magnetic adherence to the hub end on radially opposite sides of the centerhole. A plate is fixedly secured to the magnet bases and is spaced from the hub end thereby. Screw means threadely engage the plate and urge the fitting against the centerhole wall.

A method of measuring blade pitch is also disclosed and comprises the steps of:

(a) providing data indicative of (i) the mean distance between the distal ends of the tenons and the axis of the rotor ("D"), (ii) mean tenon height ("H"), and (iii) mean shroud thickness ("T");

(b) rotating the rotor (at approximately 3 RPM);

(c) generating a rotor pulse each time the rotor is rotated a selected, incremental angular distance;

(d) providing the number of rotor pulses generated when the rotor is rotated 360° ("N");

(e) detecting when a tenon passes through the selected location about the rotor and generating a tenon pulse each time a tenon is detected;

(f) maintaining a data record indicative of the number of rotor pulses that have occurred relative to the occurence of tenon pulses;

(g) determining, for each tenon, the number of rotor pulses that have occurred since the occurrence of the tenon pulse corresponding to the previous tenon; and (h) multiplying the result of each determination made in step (g) by the value of $(D-H+T/2)\cdot \pi$ and dividing the resulting quantity by the value of "N", the result of each calculation defining a blade pitch. The method may also comprise the further steps of assigning each blade pitch to a blade number and providing a printout of blade pitch versus blade number.

BRIEF DESCRIPTION OF THE DRAWINGS

FIG. 5 is diagrammatic illustration of a pulse generated by the tenon sensor of the present invention.

FIG. 6 is a perspective view of a tenon sensor according to the present invention.

FIG. 7 is a schematic diagram of an angle encoder assembly according to the present invention.

DETAILED DESCRIPTION OF THE PREFERRED EMBODIMENT

Figure 1:
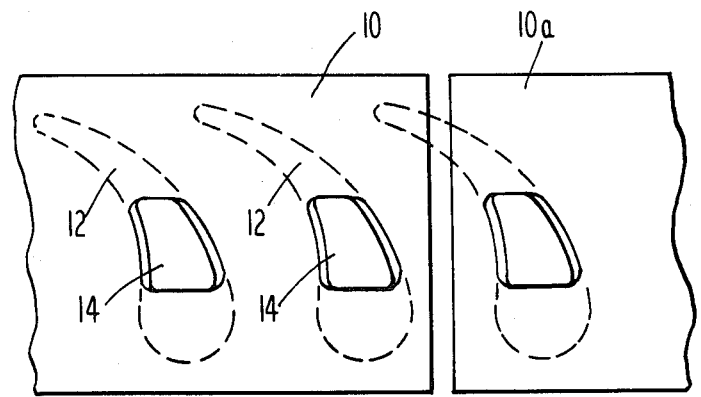
FIG. 1 is a top plan view of a portion of a turbine and illustrates a pair of shroud segments in mating engagement with tenons.
Figure 2:
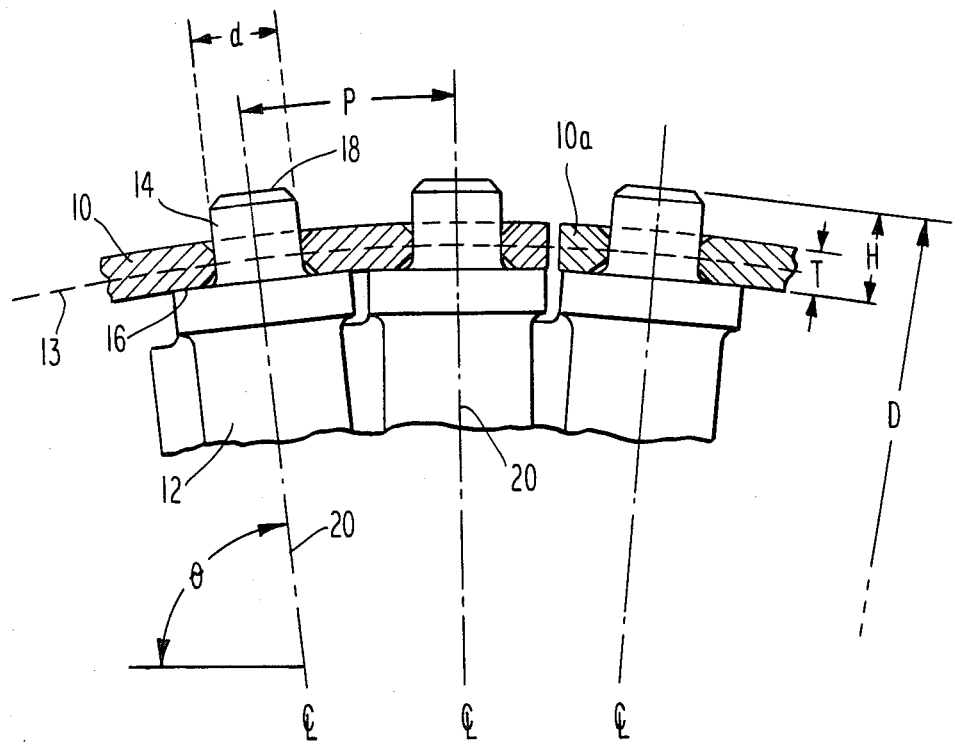
FIG. 2 is a cross sectional view of a portion of a turbine and illustrates a plurality of turbine blades, each having a tenon disposed on the distal end thereof for attachment to a shroud segment.

Referring now to the drawings wherein like numerals represent like elements, there is illustrated in FIG. 1 a portion of a turbine including shroud segments 10 and 10a. Although only two shroud segments 10 and 10a are shown, those skilled in the art will appreciate that turbines of the type illustrated incorporate a plurality of shroud segments 10, 10a, etc. collectively defining a shroud. As is also known, blades 12 are arranged in at least one row about a rotor 72 and are rotatable therewith. See FIG. 4. As best illustrated in FIG. 2, a tenon 14 is disposed on the distal end of each blade 12 for attachment to the shroud. Each tenon 14 has diameter d and is disposed on its corresponding blade 12 about a centerline 20. The circumferential distance between the centerlines 20 of adjacent tenons 14 at the mean shroud diameter 13 is the true pitch, P. Moreover, the centerline 20 of each tenon 14 resides at a particular angular position $\phi$ with respect to the rotor 72.

Tenons 14 mate with apertures in the shroud that are spaced to coincide with the circumferential spacing of the tenons 14. Thus, both the true pitch and diameter of tenons 14 must be known to machine a shroud. More particularly, the circumferential spacing between adjacent tenons must be known along a centerline 13 of the shroud.

Also illustrated in FIG. 2 are the following dimensions that permit the apparatus of the present invention to compute the mean distance between the axis of rotor 72 and centerline 13, as will become evident hereinafter: (i) the mean distance "D" between the axis of rotor 72 and the distal ends 18 of tenons 14; (ii) the mean tenon height "H" measured between shoulders 16 of blades 12 (upon which the shroud rests) and the distal ends 18 of tenons 14; and (iii) the mean thickness "T" of the shroud.

Figure 3:
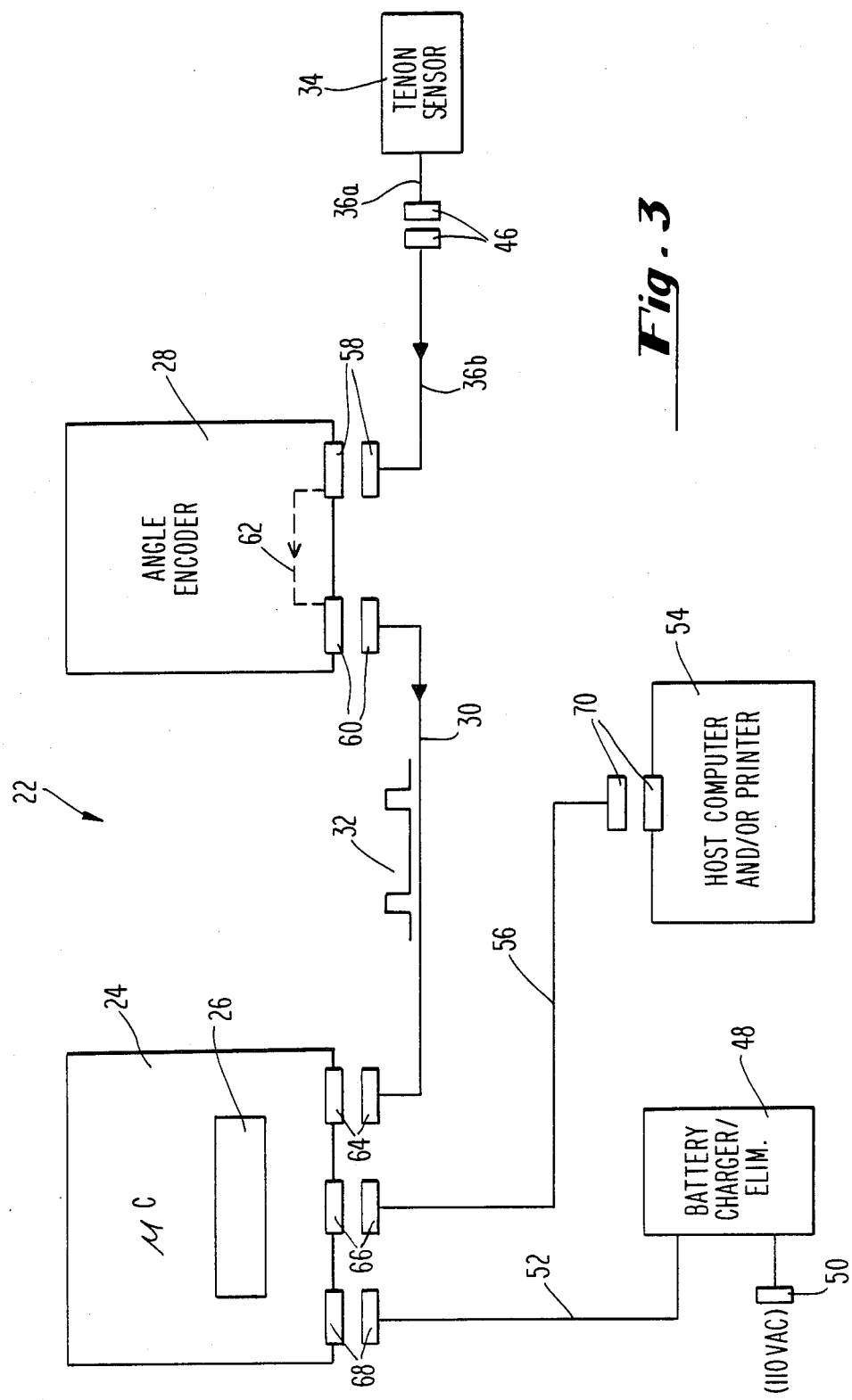
FIG. 3 is a simplified block diagram of an apparatus according to the present invention.

Referring now to FIG. 3, there is illustrated in block diagram form an apparatus for measuring blade pitch, designated generally 22. Apparatus 22 comprises a processing means 24 such as a micro-computer (CPU) suitably programmed in a manner described hereinafter. (Processing means 24 is hereinafter referred to as "micro-computer 24".) Micro-computer 24 may include a display 26 for displaying certain pitch data, as is also described hereinafter. An angle encoder 28 is operatively coupled to the micro-computer 24 via a cable 30 and connectors 60 and 64. Also operatively coupled to the micro-computer 24, via angle encoder 28 is a tenon sensor 34. Tenon sensor 34 is coupled to the angle encoder 28, via cables 36a, 36b and connectors 46 and 58. A line 62 daisy chains the signal from tenon sensor 34 onto cable 30 for receipt by the micro-computer 24. As illustrated, angle encoder 28 provides a first pulse train 32 via cable 30 when the rotor 72 is rotated, and tenon sensor 34 provides a second pulse train comprising a plurality of pulses 38 (FIG. 5) to micro-computer 24 via cables 36a, 36b, 62 and 30 when tenons are detected thereby.

Micro-computer 24 is also coupled to a host computer 54 via a cable 56 and connectors 66 and 70. The host computer may include a printer for reasons that will become evident hereinafter. The micro-computer 24 is preferably powered by a battery or by a battery charger/eliminator 48 that receives AC power from a source 50 and provides DC power to the micro-computer 24 via cable 52 and connectors 68.

Figure 4:
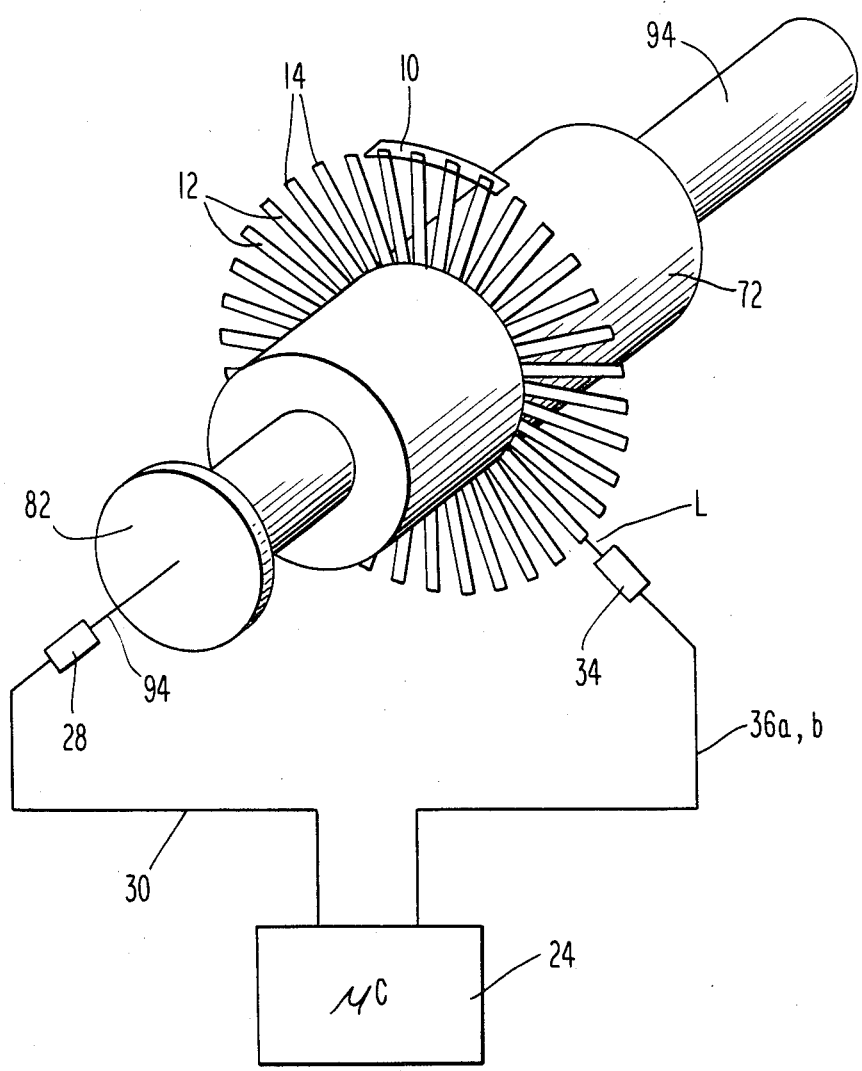
FIG. 4 is a simplified schematic diagram illustrating the cooperation of the angle encoder and tenon sensor with the rotor and tenons, respectively.

Referring to FIG. 4, additional details of the apparatus 22 will be explained.

As illustrated, angle encoder 28 has a shaft 94 operatively coupled to the hub end 82 of rotor 72 for rotation therewith. Preferably, the angle encoder 28 is a high resolution, industrial grade optical incremental encoder such as a Teledyne Gurley Series 835 rotary incremental encoder. Thus, angle encoder 28 provides a pulse ("first" pulse or "rotor" pulse) on cable 30 each time the rotor 72 has been rotated an incremental amount. As will be appreciated, the signal from the angle encoder 28 is an indication of the instantaneous angular position of the rotor relative to a starting or reference location (i.e., the number of pulses in the pulse in the pulse train 32, counted from the beginning of measurement cycle, is indicative of the instantaneous angular position of the rotor 72 relative to the reference location.) According to the preferred practice of the invention, the pulse encoder 28 provides 432,000 pulses for each 360° rotation of rotor 72.

As illustrated, the tenon sensor 34 is positioned at a selected location "L" about the rotor 72. Tenon sensor 34 provides a pulse 38 ("second" pulse or "tenon" pulse) each time a tenon 14 passes through the selected location "L". As will be appreciated, tenon sensor 34 will provide a pulse train in response to the passage of plural tenons through the location "L" wherein the number of pulses 38 in the pulse train, counted from the beginning of a measurement cycle, is indicative of the number of tenons that have passed through the selected location "L".

The cable 36a, 36b in FIG. 4 are shown as being connected directly to micro-computer 24. Thus, the pulses 38 may be daisy chained through the angle encoder 38 shown in FIG. 2, or provided directly to micro-computer 24 as illustrated in FIG. 4.

Tenon sensor 34 may comprise any suitable means for detecting passage of a tenon 14 through the selected location L, such as a magentic probe, an optical detector, etc. According to the preferred practice of invention, the tenon sensor utilizes an optical emitter and detector, such as illustrated in FIG. 6. Thus, tenon sensor 34 may comprise a generally U-shaped bracket 74 having an optical emitter (light source) 78 disposed on the distal end of one U leg and a photodetector 80 disposed on the distal end of the other U-leg. The light source 78 is adapted to direct a light beam across the path of rotation of the tenons 14 and the photodetector 80 is positioned to detect when a tenon 14 is in the path of a light beam. Thus, the photodetector 80 provides a pulse output each time a tenon 14 blocks the passage of light from light source 78 to photodetector 80. More particularly, referring to FIG. 5, each pulse 38 provided by photodetector 80 has a leading edge 40 (TLE), a trailing edge 42 (TTE) and a pulse width 44 (TPW). As will be appreciated, the occurrence of each leading edge 40 is indicative of the photodetector 80 first detecting the presence of a tenon 14 at the selected location L and the occurrence of each trailing edge 42 is indicative of the photodetector 80 first ceasing to detect the presence of a tenon 14 at the selected location L. Stated otherwise, the tenon sensor 34 provides an indication of a tenon 14 first entering the selected location L (leading edge 40) and an indication of the tenon 14 having exited the selected location L (trailing edge 42). It will be appreciated that the pulse width 44 of each pulse 38 is indicative of the diameter d of the tenon 14 causing the pulse 38. Moreover, those skilled in the art will appreciate that, with the data provided by angle encoder 28 and tenon sensor 34, micro-computer 24 can be programmed to provide an indication of the angular position (on the rotor 72) of each tenon 14. And, in conjunction with the data D, H, and T (previously defined), the true pitch of each tenon 14 along the centerline 13 can be computed. A method for doing so is described below.

Referring to FIG. 7, a means for coupling the angle encoder 28 to the rotor 72 for rotation therewith is described. Angle encoder 28 is supported by a bracket 96 which rests upon a tripod 95. A fitting 86 is adapted to mate with the centerhole 84 in the hub end 82 of rotor 72. More particularly, the fitting 86 is adapted to frictionally engage with walls of the centerhole 84. An extension 88 is integral with the fitting 86 and extends through a hole in a plate 100. A first rod 90a has one end fixedly secured to the extension 88 and the other end fixedly secured to a first flexible coupling 92. A second rod 90b has one end fixedly secured to the first flexible coupling 92 and the other end fixedly secured to a second flexible coupling 93. The shaft 94 of optical encoder 28 is fixedly secured to the second flexible coupling 93. A pair of magnet bases 98 are adapted to magnetically adhere to the hub end 82 on radially opposite sides of the centerhole 84 and space the plate 100 from the hub end 82. Cap screws 102 secure the plate 100 to the magnet bases 98. Screws or threaded rods 104 threadedly engage with holes in the plate 100 so as to urge the fitting 86 into frictional engagement with the walls of centerhole 84. Thus, rotation of the rotor 72 results in a corresponding rotation of the shaft 94 of optical encoder 28.

As mentioned, the occurrence of each pulse from the angle encoder 28 ("rotor pulse") is indicative of the rotor 72 having been rotated an incremental angular distance. For example, one pulse may indicate that the rotor has been rotated 3 arc seconds. Micro-computer 24 is programmed to automatically detect the occurrence of each rotor pulse and maintain a running count of the total number of rotor pulses that have occurred since the beginning of the measurement cycle. Hence, the value of this running count at any time is indicative of the instantaneous angular position of the rotor relative to a starting, reference point. Micro-computer 24 is also programmed to detect the occurrence of each pulse 38 generated by the tenon sensor ("tenon pulse"), including the occurrence of each leading edge 40 and each trailing edge 42 thereof. Each time micro-computer 24 detects the occurrence of a leading edge 40, micro-computer 24 records the current value of the running count of rotor pulses as an indication of the angular position (on the rotor) of the corresponding edge of the tenon 14. Micro-computer 24 may also be programmed to record data indicative of the time that each leading edge 40 occurs. For example, a software counter may be utilized to count the number of pulses generated by a time base (e.g., the micro-computer's on board clock) since the beginning of the measurement cycle. Similarly, each time a trailing edge 42 is detected by micro-computer 24, micro-computer 24 records the current value of the running count of rotor pulses as an indication of the angular position (on the rotor) of the corresponding edge of tenon 14. As before, micro-computer 24 may record data indicative of the relative time that trailing edge 42 occurred. The time difference between the occurrence of each leading edge 40 and each trailing edge 42 of pulse 38 is indicative of the pulse width of pulse 38, and hence of the tenon's diameter.

Micro-computer 24 is further programmed to maintain a running count of the number of tenon pulses that have been detected. As will be appreciated, this count is indicative of the number of blades that have passed through the location L. For each tenon 14 detected by micro-computer 24, micro-computer 24 provides a "blade data record" comprising (i) the number of the blade ("I") on which the tenon just detected appears; (ii) the angular position of the rotor 72 at which the leading 40 was detected ("A1"); (iii) the relative time when the leading edge 40 was detected ("T1"); (iv) the angular position of the rotor 72 when the leading edge 42 was detected ("A2"); and (v) the relative time when the leading edge 42 was detected ("T2").

The micro-computer 24 may utilize display 26 for displaying the data I, A1, T1, A2 and T2 for each tenon 2014, if desired.

Each of the blade data records may either be transferred to the host computer 54 for further processing or immediately to a separate printer for hard copy reference. In the preferred embodiment of the invention, each blade data record is transmitted in serial format over cable 56 to host computer 54. The host computer 54 signals the micro-computer 24 when it is ready to receive the next blade data record. If the micro-computer 24 is transmitting data at a rate faster than the host computer 54 (or printer) is capable of receiving it, micro-computer 24 automatically stores the blade data records in an internal data buffer. Either way, each blade data record is stored in the data buffer for the purpose of ensuring the integrity of all data records, as well as preventing loss of data.

Figure 8:
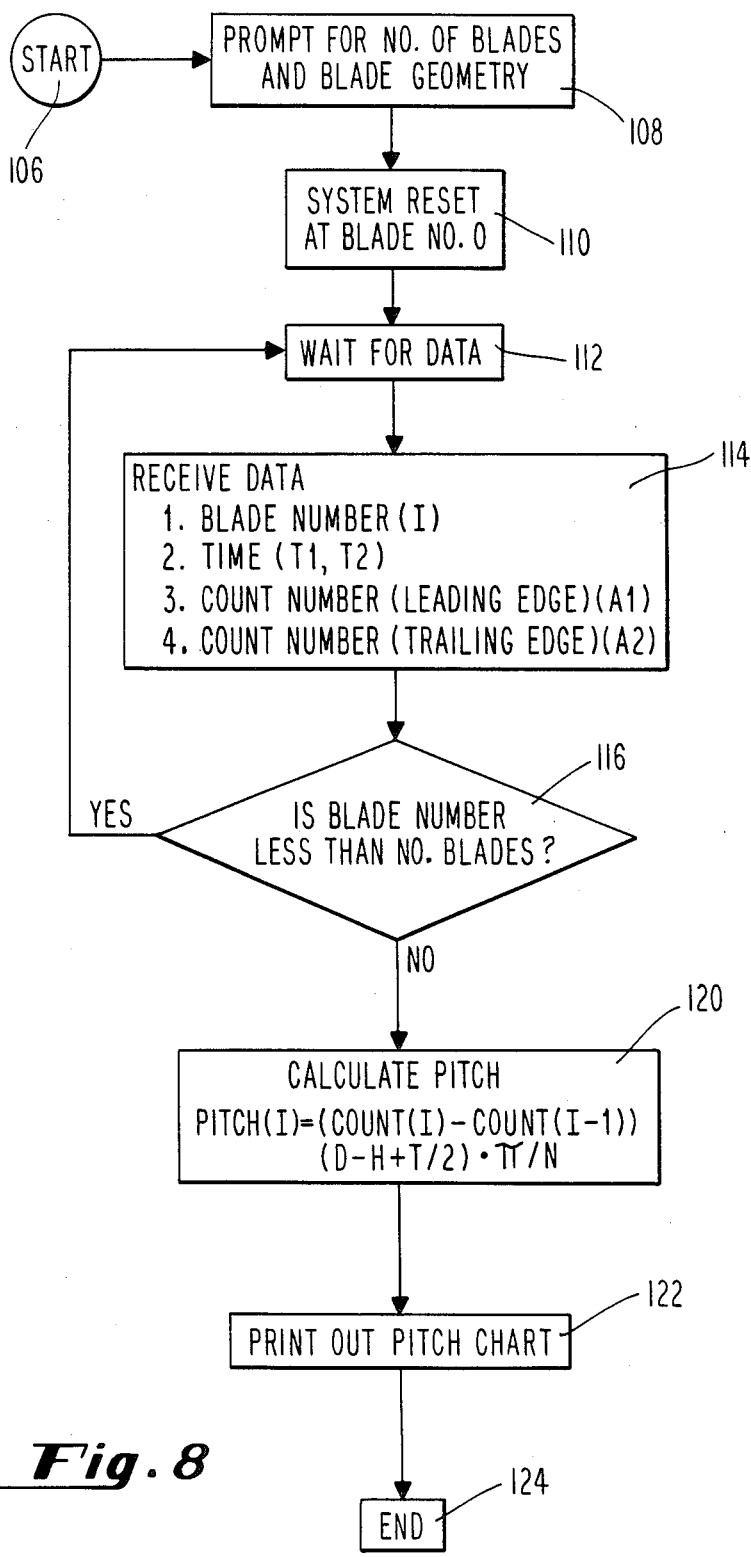
FIG. 8 is a flow chart of the functions performed by the processing means of the present invention.

FIG. 8 illustrates in flowchart form the functions performed by host computer 54. As illustrated at 106, when the unit is started, the host computer 108 prompts the user for the following data: (i) the number of blades on the turbine under test; and (ii) the values of the dimensions D, H, and T (FIG. 2). This data is entered via user input means, such as a keyboard (not shown) operatively coupled to host computer 54. As illustrated at 110, when the first tenon (blade no. 0) is detected at the beginning of a measurement cycle, host computer 54 executes a system reset whereby data from a previous test is erased. Host computer 54 then awaits the receipt of each blade data record from micro-computer 24, as indicated at blocks 112 and 114. As indicated at block 116, the blade data records are not processed by host computer 54 until host computer 54 has determined that a blade data record has been received for each blade, i.e., not until the rotor has been rotated 360°. This test is performed by comparing the number of blades on the rotor (input by the operator at 108) to the value of "I" in each blade data record.

After all blade data records have been received, host computer 54 computes therefrom the pitch of each tenon along the centerline 13 of shroud 10, as indicated at 120. The pitch for each tenon ("PITCH I", where I is the blade number) is computed by subtracting the value of A2 for the previous tenon ("COUNT (I−1)") from the value of A1 for the current tenon ("COUNT I"). The result of each such calculation is multiplied by the value of D−H +T/2 (the mean distance between the axis of rotor 72 and the centerline 13 of shroud 10) multiplied by the value of $\pi$, then divided by a constant "N". "N" is a value indicative of the number of rotor pulses generated when the rotor is rotated 360°. This value may be either permanently stored in the memory of host computer 54 or entered by the user at step 108.

Though the above calculation is described using the value of A1 for each tenon, the value of A2 may be used instead. Alternatively, if desired, host computer 54 may compute the average of A1 and A2 for each tenon to provide a value (count) indicative of the true center of each tenon 14, and this average may be utilized in the computation depicted at 120, whereby an indication of true pitch will be provided. Still further, if desired, the difference between T1 and T2 may be computed for each tenon, whereby an indication of tenon diameter is provided. Also, if desired, T1 and T2 may be used by the host computer 54 to monitor the speed of rotation of the rotor 72 for the purpose of preventing errors if the rotor 72 is rotated too quickly.

As indicated at 122, host computer 54 causes a printer to provide a printout of pitch versus blade number for each tenon. If desired, the diameter of each tenon may also be printed out. Processing ends after completion of step 122, as indicated at 124.

The present invention may be embodied in other specific forms without departing from the spirit or essential attributes thereof. Specifically, the present invention is not limited in application to measuring blade pitch in a turbine, but may be utilized in any application where it is desired to measure the circumferential spacing between objects disposed about and rotatable with rotor. Accordingly, reference should be made to the appended claims, rather than to the foregoing specification, as indicating the scope of the invention.

I claim as my invention

1. Blading apparatus for measuring blade pitch in a turbine having a rotor, at least one row of blades circumferentially disposed about and rotatable with the rotor, and a tenon disposed at the distal end of each blade for attachment to a shroud, comprising:
    (a) first means for providing an indication of the instantaneous angular position of the rotor relative to a reference location;
    (b) second means for providing an indication of the passage of a tenon through a selected location about the rotor; and
    (c) third means operatively coupled to and responsive to the indications provided by the first and second means for providing an indication of the angular position of each tenon.

2. Apparatus according to claim 1 wherein the first means comprises means for providing a first pulse each time the rotor has been rotated an incremental distance, plural sequential first pulses defining a first pulse train, the number of first pulses appearing in the first pulse train being indicative of the instantaneous angular position of the rotor relative to the reference location.

3. Apparatus according to claim 2 wherein the first means comprises an optical angle encoder operatively coupled to the rotor for rotation therewith.

4. Apparatus according to claim 2 wherein the second means comprises means for providing a second pulse T2 each time a tenon passes through the selected location, plural sequential second pulses defining a second pulse train, the number of second pulses appearing in the second pulse train being indicative of the number of tenons that have passed through the selected location.

5. Apparatus according to claim 4 wherein each second pulse has a leading edge indicative of a (tenon) first entering the selected location and a trailing edge indicative of a tenon having exited the selected location.

6. Apparatus according to claim 4 wherein the second means comprises a light source adapted to direct a light beam across the path of rotation of the tenons and a photodetector positioned to detect when a tenon is in the path of the light beam.

7. Apparatus according to claim 5 wherein the third means comprises a micro-computer programmed to count the number of pulses appearing in each of the first and second pulse trains and to compute, for each tenon detected by the second means, a blade data record comprising (i) the number of the blade containing the tenon, (ii) the angular position of the rotor when the tenon entered the selected location, and (iii) the angular position of the rotor when the tenon exited the selected location.

8. Apparatus according to claim 7 wherein the third means further comprises a display for providing a visual indication of each blade data record.

9. Apparatus according to claim 7 wherein the third means further comprises a host computer receiving blade data records computed by the micro-computer and programmed to compute therefrom the circumferential distance between adjacent tenons.

10. Apparatus according to claim 9 wherein the host computer comprises user input means for entering data indicative of (i) the mean distance between the tenon distal ends and the rotor axis, (ii) mean tenon height, and (iii) mean shroud thickness, and is further programmed to compute therefrom the mean distance between the rotor axis and a shroud centerline, and in conjunction with the blade data records, the circumferential distance between adjacent tenons along the shroud centerline.

11. Apparatus according to claim 10 wherein the host computer further comprises a printer for providing a printout of the circumferential spacing of each tenon along the centerline.

12. In a turbine having a rotor, at least one row of blades circumferentially disposed about and rotatable with the rotor, and a tenon disposed at the distal end of each blade for attachment to a shroud, a blading apparatus for measuring the circumferential spacing between adjacent tenons, comprising:
   (a) an angle encoder having a shaft operatively coupled to the rotor for rotation therewith, the angle encoder providing a first pulse train in response to rotation of the rotor, the number of pulses appearing in the first pulse train being indicative of the instantaneous angular position of the rotor relative to a reference location;
   (b) a tenon sensor for detecting the passage of tenons through a selected location about the rotor, the tenon sensor providing a second pulse train in response to passage of tenons through the selected location; and
   (c) processing means operatively coupled to the angle encoder and tenon sensor to receive the pulses appearing in the first and second pulse trains and adapted to process the pulses to provide, for each tenon, a blade data record containing data indicative of the number of the blade on which each detected tenon appears and the relative angular position of each tenon.

13. Apparatus according to claim 12 wherein the tenon sensor comprises a light source adapted to direct a light beam across the path of rotation of the tenons and a photodetector positioned to detect when a tenon is in the path of the light beam.

14. Apparatus according to claim 12 further comprising an angle encoder assembly for coupling the shaft of the angle encoder to the rotor, the assembly comprising a fitting adapted to mate with a centerhole in a hub end of the rotor, a rod having one end fixedly secured to the fitting and the other end fixedly secured to the shaft of the angle encoder via a flexible coupling, a bracket for supporting the angle encoder, and means for urging the fitting into frictional engagement with the wall of the centerhole including a pair of magnet bases for magnetic adherence to the hub portion on radially opposite sides of the centerhole, a plate fixedly secured to the magnet bases and being spaced from the hub portion by the magnet bases, and screw means threadedly engaging the plate for urging the fitting against the centerhole wall.

15. Apparatus according to claim 12 wherein the processing means comprises user input means for entering data indicative of (i) the mean distance between the rotor axis and the distal ends of the tenons, (ii) mean tenon height, and (iii) mean shroud thickness, and adapted to process the user input data and each of the blade records to provide an indication of the circumferential spacing of the tenons along a centerline of the shroud.

16. Apparatus according to claim 15 wherein the processing means comprises a micro-computer receiving the pulses appearing in the first and second pulse trains and programmed to compute each of the blade data records, and a host computer receiving the blade data records and user input data and programmed to compute (i) the mean distance between the shroud centerline and the rotor axis and (ii) the circumferential spacing of the tenons along the centerline of the shroud.

17. In a turbine having a rotor, a plurality of blades circumferentially arranged in at least one row about and rotatable with the rotor, and a tenon disposed at the distal end of each blade for attachment to a shroud, a blading apparatus for providing an indication of the circumferential distance between tenons along a centerline of the shroud, comprising:
   (a) an angle encoder having a shaft operatively coupled to the rotor for rotation therewith, the angle encoder providing a first pulse train in response to rotation of the rotor, the number of pulses appearing in the first pulse train being indicative of the instantaneous angular position of the rotor relative to a reference location;
   (b) an angle encoder assembly for coupling the shaft to the rotor comprising a fitting adapted to mate with a centerhole in a hub end of the rotor, a rod having one end fixedly secured to the fitting and the other end fixedly secured to the shaft of the angle encoder via a flexible coupling, a bracket for supporting the angle encoder, and means for urging the fitting into frictional engagement with the wall of the centerhole including a pair of magnet bases for magnetic adherence to the hub portion on radially opposite sides of the centerhole, a plate fixedly secured to the magnet bases and being spaced from the hub portion by the magnet bases, and screw means threadedly engaging the plate for urging the fitting against the centerhole wall;
   (c) a tenon sensor comprising a light source adapted to direct a light beam across the path of rotation of the tenons and a photodetector positioned to detect when a tenon is in the path of the light beam, including a bracket for supporting the light source and photodetector at a selected location adjacent the path of rotation of the tenons, the photodetector providing a second pulse train in response to passage of tenons through the selected location, the number of pulses appearing in the second pulse train being indicative of the number of tenons that have passed through the selected location, each pulse having a leading edge indicative of the photodetector first detecting a tenon and a trailing edge indicative of the photodetector first ceasing to detect a tenon;
   (d) a micro-computer receiving the pulses appearing in the first and second pulse trains and programmed to compute therefrom a blade data record for each tenon, each blade data record including (i) data indicative of the number of the blade containing the tenon, (ii) the angular position of the rotor when the tenon sensor first detected the tenon, and (iii) the angular position of the rotor when the tenon sensor first ceased to detect the tenon; and
   (e) a host computer receiving each blade data record from the micro-computer and having user input means for entering data indicative of (i) the mean radial distance between the axis of the rotor and the distal ends of the tenons, (ii) mean tenon height, (iii) mean shroud thickness, and (iv) the total number of blades in the row, and programmed to compute therefrom (v) the mean radial distance between the axis of the rotor and the centerline of the shroud and (vi) the circumferential distance between adjacent tenons along the centerline of the shroud and provide a visual indication thereof.

18. Apparatus according to claim 17 wherein the micro-computer further comprises a display for displaying each blade data record.

19. Apparatus according to claim 18 wherein the visual indication provided by the host computer is a printout of blade pitch.

20. Blading method of measuring blade pitch in a turbine having a rotor, a plurality of blades circumferentially arranged in at least one row about and rotatable with the rotor, and a tenon disposed at the distal end of each blade for attachment to a shroud, the method comprising the steps of:

(a) providing data indicative of (i) the mean distance between the distal ends of the tenons and the axis of the rotor, being defined as D, (ii) mean tenon height, being defined as H, and (iii) mean shroud thickness being defined as T;

(b) rotating the rotor;

(c) generating a rotor pulse each time the rotor is rotated a selected, incremental angular distance;

(d) providing the number of rotor pulses generated when the rotor is rotated 360°, being defined as N;

(e) detecting when a tenon passes through a selected location about the rotor and generating a tenon pulse each time a tenon is detected;

(f) maintaining a data record indicative of the number of rotor pulses that have occurred relative to the occurrence of tenon pulses;

(g) determining, for each tenon, the number of rotor pulses that occurred since the occurrence of the tenon pulse corresponding to the previous tenon; and (h) multiplying the result of each determination made in step (g) by the value of $(D-H+T/2) \times \pi$ and dividing the resulting quantity by the value of N, the result of each calculation defining a blade pitch.

21. Method according to claim 20 further comprising the steps of:

(i) assigning each blade pitch to a blade number; and (j) providing a printout of blade pitch versus blade number.

22. Method according to claim 20 further comprising the steps of:

(k) providing the number of blades in the row;

(l) determing when the rotor has been rotated 360° by maintaining a count of the rotor pulses and periodically comparing the count to the number of blades in the row; and (m) performing steps (g) and (h) only after it has been determined that the rotor has been rotated 360°.

* * * * *